US010941959B2

(12) United States Patent
Froemke (10) Patent No.: US 10,941,959 B2
(45) Date of Patent: Mar. 9, 2021

(54) AIR TEMPERATURE CONTROL USING POTABLE WATER

(71) Applicant: Lee W. Froemke, Fargo, ND (US)

(72) Inventor: Lee W. Froemke, Fargo, ND (US)

(73) Assignee: Lee W. Froemke, Fargo, ND (US)

( * ) Notice: Subject to any disclaimer, the term of this patent is extended or adjusted under 35 U.S.C. 154(b) by 84 days.

(21) Appl. No.: 16/121,842

(22) Filed: Sep. 5, 2018

(65) Prior Publication Data
US 2019/0072292 A1 Mar. 7, 2019

Related U.S. Application Data

(60) Provisional application No. 62/554,906, filed on Sep. 6, 2017.

(51) Int. Cl.
| *F24F 11/84* | (2018.01) |
| *F24F 3/048* | (2006.01) |
| *F24F 5/00* | (2006.01) |
| *F24F 3/08* | (2006.01) |
| *G05D 23/19* | (2006.01) |

(Continued)

(52) U.S. Cl.
CPC .............. *F24F 11/84* (2018.01); *F24F 3/048* (2013.01); *F24F 5/0096* (2013.01); *F24F 3/08* (2013.01); *F24F 11/46* (2018.01); *F24F 2110/12* (2018.01); *F24F 2221/183* (2013.01); *G05D 23/1931* (2013.01)

(58) Field of Classification Search
CPC .. F24F 3/048; F24F 3/08; F24F 5/0096; F24F 11/46; F24F 11/84; F24F 2221/183; F24F 2110/12; G05D 23/1931
See application file for complete search history.

(56) References Cited

U.S. PATENT DOCUMENTS

| 1,938,833 A | 12/1933 | Irons, Sr. |
| 2,031,576 A | 2/1936 | Saathoff |

(Continued)

OTHER PUBLICATIONS

"2014 BT Presentation," Bulldog Heat Pump Powerpoint Presentation by CGC Group, Inc. 2014 (102 pages).

(Continued)

*Primary Examiner* — Marc E Norman
(74) *Attorney, Agent, or Firm* — Pauly, DeVries Smith & Deffner LLC (57) ABSTRACT

Various embodiments include a system for controlling air temperature. The system can include a potable water piping system, a cooling system, and a heating system. The potable water piping system can include potable water supply piping and potable water return piping. The cooling system can be coupled to the potable water piping system. The cooling system can include a water-refrigerant heat exchanger; an air-refrigerant coil; a compressor coupled between the water-refrigerant heat exchanger and the air-refrigerant coil; and an expansion valve coupled between the water-refrigerant heat exchanger and the air-refrigerant coil. The heating system can be coupled to the potable water piping system. The heating system can include a hot water coil. The water-refrigerant heat exchanger can be coupled to the potable water supply piping and the potable water return piping. The hot water coil can be coupled to the potable water supply piping and the potable water return piping.

20 Claims, 5 Drawing Sheets

(51) Int. Cl.
   *F24F 110/12*    (2018.01)
   *F24F 11/46*     (2018.01)

(56) References Cited

U.S. PATENT DOCUMENTS

| | | | |
|---|---|---|---|
| 3,939,914 A | | 2/1976 | Carroll |
| 4,314,456 A | * | 2/1982 | Harnish ............... F25B 49/027 62/181 |
| 5,183,102 A | | 2/1993 | Clark |
| 5,573,183 A | | 11/1996 | Leskinen |
| 6,488,081 B2 | | 12/2002 | Rayburn et al. |
| 8,122,944 B2 | | 2/2012 | Clark |
| 9,310,087 B2 | | 4/2016 | Grabon et al. |
| 9,410,752 B2 | | 8/2016 | Wallace |
| 2003/0024685 A1 | * | 2/2003 | Ace ..................... F24D 11/0214 165/45 |
| 2007/0044501 A1 | * | 3/2007 | Schnell ................. F24D 12/02 62/331 |
| 2009/0288437 A1 | * | 11/2009 | Matsuoka ............... F24F 3/06 62/238.6 |
| 2011/0067840 A1 | | 3/2011 | Thierfelder |
| 2012/0267084 A1 | * | 10/2012 | Crawford ............... F28D 9/005 165/170 |
| 2014/0245762 A1 | | 9/2014 | Schlesinger |
| 2015/0019023 A1 | * | 1/2015 | Kotake ................. G06Q 50/06 700/276 |

OTHER PUBLICATIONS

"A True Heat Recovery Water Source Heat Pump System," CGC Group, Inc. product description retrieved from http://web.archive.org/web/20170114224359/http://bulldogheatpump.com/wp-content/uploads/2016/06/A-true-heat-reco-HP.pdf in Jun. 2013 (6 pages).

"Bulldog Heat Pump Cooling Cycle," retrieved from http://bulldogheatpump.com:80/cooling-cycle on Jun. 13, 2016 (2 pages).

"Bulldog Heat Pump FreeHeat," retrieved from http://bulldogheatpump.com:80/freeheat/ on Jun. 13, 2016 (3 pages).

"Bulldog Heat Pump Heating Cycle," retrieved from http://bulldogheatpump.com:80/heating-cycle/ on Jun. 13, 2016 (2 pages).

"Bulldog Heat Pump Operation," retrieved from http://bulldogheatpump.com:80/bulldog-operation on Jun. 13, 2016 (2 pages).

"Bulldog Heat Pump," CGC Group Product Brochure retrieved from http://web.archive.org/web/20170114215636/http://bulldogheatpump.com/wp-content/uploads/2016/06/CGC_Corp_BrochureV8.pdf in Jun. 2016 (2 pages).

"Bulldog SpaceKeeper Horizontal Heat Pump-Guide Specification," published by CGC Group Inc. Feb. 27, 2013 (3 pages).

"Double Wall Condenser Coils," Packless Specification Sheet Aug. 22, 2017 (1 page).

"Double Wall Vented Condensers," Edwards Coils Corporation Coaxial Enhanced Fin Coils 2007 description retrieved from http://www.edwardscoils.com/doublewallvented.htm on Sep. 25, 2018 (1 page).

"Edwards Coils Corporation Coaxial Enhanced Fin Heat Exchangers," downloaded http://web.archive.org/web/20130906071143/http://edwardscoils.com/pdfbrochure.pdf on Sep. 6, 2013 (8 pages).

"Ips Integrated Piping System Description," Williams. Aug. 20, 2010 downloaded from http://www.absgoc.com/download/real-state/how-ips-work/1-IPS-System-Description.pdf on Oct. 29, 2018 (4 pages).

"Why Should You Use a Bulldog Heat Pump System?," CGC Group Product Guide, May 17, 2018 (2 pages).

"Williams Applied Products Integrated Piping System Powerpoint Presentation," May 8, 2013. retrieved from http://www.absgoc.com/download/what-is-ips/presentation-publication/integrated-piping-system.pdf on Oct. 29, 2018 (23 pages).

"Williams Integrated Piping System Cost," Jan. 2016 (1 page).

* cited by examiner

AIR TEMPERATURE CONTROL USING POTABLE WATER

PRIORITY CLAIM

This application claims the benefit of U.S. Provisional Application No. 62/554,906, filed Sep. 6, 2017, the content of which is herein incorporated by reference in its entirety.

FIELD OF THE TECHNOLOGY

The present application relates to various apparatuses, systems, and methods for controlling air temperature. More specifically, the present application relates to the use of potable water with controlling air temperature.

BACKGROUND

Traditionally, room by room heating and cooling systems in buildings have incorporated the integrated or hydronic piping system of the building using a four pipe system and fan coils. The four pipes can include a hot water supply, a hot water return, a cold water supply and a cold water return. The hot water supply is used for heating and the cold water supply is used for cooling. The use of hot water and cold water requires the fan coils to have connections for the hydronic hot water supply and return, in addition to connections for the hydronic cold water supply and return. The cold water supply is frequently connected to a chiller and pumps, leading to additional expenses. In some scenarios, one space within a building can call for cooling while another space within the building calls for heating. This situation can result in inefficient energy usage. Further, providing a four pipe system through an entire building can be expensive.

In other situations hydronic heat pump systems have been used. The heat pump systems can utilize reversing valves and an independent hydronic water loop to provide a heat transfer media. Providing the piping for the hydronic water loop can be expensive. Further, the additional refrigeration components add complexity and cost to the equipment.

Hybrid heat pump alternatives have used a refrigeration circuit with a non-reversing operation. Hybrid heat pump systems can be expensive, though, since they must be provided with an adequate hydronic piping system. Accordingly, there is a need for a more efficient and cost effective system to control air temperature.

SUMMARY

Various embodiments include a system for controlling air temperature. The system can include a potable water piping system, a cooling system, and a heating system. The potable water piping system can include potable water supply piping and potable water return piping. The cooling system can be coupled to the potable water piping system. The cooling system can include a water-refrigerant heat exchanger; an air-refrigerant coil; a compressor coupled between the water-refrigerant heat exchanger and the air-refrigerant coil; and an expansion valve coupled between the water-refrigerant heat exchanger and the air-refrigerant coil. The heating system can be coupled to the potable water piping system. The heating system can include a hot water coil. The water-refrigerant heat exchanger can be coupled to the potable water supply piping and the potable water return piping. The hot water coil can be coupled to the potable water supply piping and the potable water return piping.

In some embodiments, the system can further include a potable water supply disposed within the piping system, wherein the potable water supply has a temperature of at least 90° F.

In some embodiments, the hot water coil is positioned upstream of the air-refrigerant coil.

In some embodiments, the hot water coil is positioned downstream of the air-refrigerant coil.

In some embodiments, the water-refrigerant heat exchanger is a double wall vented heat exchanger.

In some embodiments, the system can further comprise a supply fan.

In some embodiments, the supply fan is in a draw through configuration with the air-refrigerant coil.

In some embodiments, the system can further include a water valve configured to selectively direct potable water within the potable water supply piping into the water-refrigerant heat exchanger and the hot water coil.

In some embodiments, the water valve is configured to selectively direct the potable water into either of the water-refrigerant heat exchanger and the hot water coil.

In some embodiments, the system can further include a thermal mixing valve coupled to the water valve. The potable water supply piping can include a first potable water piping system coupled to the thermal mixing valve and a second potable water piping system coupled to the thermal mixing valve. In some cases the first potable water piping system supplies a first potable water supply having a temperature greater than 90° F. In some cases the second potable water piping system supplies a second potable water supply having a temperature less than 90° F.

In some embodiments, the system can further include a supply air temperature sensor configured to monitor the air temperature of air after the air-refrigerant coil.

In some embodiments, the system can further include a controller configured to control an output temperature of air after the air-refrigerant coil.

In some embodiments, the controller comprises a microprocessor controller.

In some embodiments, the water-refrigerant heat exchanger comprises a plurality of plates.

In some embodiments, the water-refrigerant heat exchanger comprises stainless steel or copper.

In some embodiments, the system can further include a boiler or a water heating device coupled to the potable water piping system.

Various embodiments include an air handling unit for controlling air temperature. The air handling unit can include a hot water coil, a cooling system, and a housing. The hot water coil can include a water inlet connection and a water outlet connection. The cooling system can include a water-refrigerant heat exchanger, an air-refrigerant coil, a compressor coupled between the water-refrigerant heat exchanger and the air-refrigerant coil, and an expansion valve coupled between the water-refrigerant heat exchanger and the air-refrigerant coil. The housing can define an air inlet, an air outlet, and an air passage extending between the air inlet and the air outlet. The hot water coil and the air-refrigerant coil can be disposed in the air passage. The water-refrigerant heat exchanger can be a double wall vented heat exchanger configured to be coupled to a potable water supply.

In some embodiments, the compressor and water-refrigerant heat exchanger are located outside of the air passage.

In some embodiments, water entering the hot water coil inlet connection has a temperature of at least 90° F.

In some embodiments, water entering the water-refrigerant heat exchanger has a temperature of at least 90° F.

In some embodiments, the hot water coil is positioned upstream of the air-refrigerant coil in the air passage.

In some embodiments, the hot water coil is positioned downstream of the air-refrigerant coil in the air passage.

In some embodiments, the unit can further include a supply fan within the housing.

In some embodiments, the supply fan is in a draw through configuration with the air-refrigerant coil.

In some embodiments, the unit can further include a water valve coupled to the hot water coil and the water-refrigerant heat exchanger, wherein the water valve is configured to selectively direct a potable water supply into the water-refrigerant heat exchanger and the hot water coil.

In some embodiments, the water valve is configured to selectively direct the potable water supply into either of the water-refrigerant heat exchanger and the hot water coil.

In some embodiments, the unit can further include a thermal mixing valve that includes a first water inlet, a second water inlet, and a water outlet. The potable water supply can include a first potable water supply having a temperature greater than 90° F. and a second potable water supply having a temperature less than 90° F. In some cases the water outlet of the thermal mixing valve is coupled to the water valve, the first water inlet of the thermal mixing valve is configured to be coupled to a first potable water supply and the second water inlet of the thermal mixing valve is configured to be coupled to the second potable water supply.

In some embodiments, the unit can further include a supply air temperature sensor disposed in the air passage after the air-refrigerant coil.

In some embodiments, the unit can further include a controller configured to control an output temperature of air after the air-refrigerant coil.

In some embodiments, the controller comprises a microprocessor controller.

In some embodiments, the water-refrigerant heat exchanger comprises a plurality of plates.

In some embodiments, the water-refrigerant heat exchanger comprises stainless steel or copper.

Various embodiments include a method for controlling air temperature. The method can include monitoring a temperature of air; comparing the temperature of the air to a temperature set point; providing heating when the temperature of the air is below the temperature set point; and providing cooling when the temperature of the air is above the temperature set point. Providing the heating can include passing air across a hot water coil and moving a potable water supply through the hot water coil. Providing the cooling can include passing air across an air-refrigerant coil and moving refrigerant through the air-refrigerant coil, wherein the air-refrigerant coil is coupled to a compressor, an expansion valve, and a water-refrigerant heat exchanger that is coupled to the potable water supply. The potable water supply has a temperature of at least 90° F.

In some embodiments, the hot water coil is positioned upstream of the air-refrigerant coil.

In some embodiments, the hot water coil is positioned downstream of the air-refrigerant coil.

In some embodiments, the water-refrigerant heat exchanger is a double wall vented heat exchanger.

In some embodiments, the air is moved with a supply fan.

In some embodiments, the supply fan is positioned in a draw through configuration with the air-refrigerant coil.

In some embodiments, the potable water supply flows through a water valve configured to selectively direct the potable water supply into the water-refrigerant heat exchanger and the hot water coil.

In some embodiments, the monitoring the temperature of the air is conducted with a temperature sensor.

In some embodiments, the temperature sensor is located downstream of the air-refrigerant coil.

In some embodiments, the water-refrigerant heat exchanger comprises a plurality of plates.

In some embodiments, the water-refrigerant heat exchanger comprises stainless steel or copper.

In some embodiments, the potable water supply comprises a mixture of a first potable water supply having a temperature greater than 90° F. and a second potable water supply having a temperature less than 90° F.

BRIEF DESCRIPTION OF THE FIGURES

The technology may be more completely understood in connection with the following drawings, in which.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Various embodiments of systems, methods, and apparatuses for controlling air temperature are disclosed herein. In some embodiments, a refrigeration circuit is used to cool air. In some implementations, the refrigeration circuit includes a water-refrigerant heat exchanger. Some examples disclosed herein utilize standard potable water piping systems that are included in many buildings, allowing for reduced installation or startup costs. As an example, some embodiments use a building's potable hot water supply. In some scenarios the potable water can have a temperature of at least 90° F., at least 110° F., or at least 120° F. The potable water supply can be coupled to or connected to a water-refrigerant heat exchanger, enabling the removal of heat from the refrigerant and subsequent transfer of the heat to the potable water supply. In other embodiments a hydronic water supply can be used, such as hydronic supply water and hydronic return or recirculation water.

According to some implementations, a building can include several air handling units. Each air handling unit can have a designated space or room(s) that the unit is responsible for heating or cooling. The air handling unit can control the air temperature in its designated space by heating or cooling air supplied to the space. In some cases, one room can demand heating while another room demands cooling. Each unit can operate separately to provide the desired heating and/or cooling to its designated space.

According to various embodiments, the same potable water supply can be used for both heating and cooling. In some embodiments, various air handling units can be connected to the same potable water supply, such that when one unit is in heating and another unit is in cooling, the changes in water temperature can be at least partially offset. For example, a unit that is heating air can use the potable water in a hot water coil. The potable water can have a reduced temperature as it exits the hot water coil and flows into return piping. A unit that is cooling air can use the potable water in a water-refrigerant heat exchanger to cool refrigerant in a refrigeration circuit. As a result, the water can have an increased temperature as it exits the water-refrigerant heat exchanger and flows into the return piping. The potable water that exits the hot water coil can be mixed at some point with the potable water that exits the water-refrigerant heat exchanger, allowing the gains and losses in water temperature to be at least partially offset. This offsetting can provide additional cost savings, since water being used for heating will not need to be heated as much and water being used for cooling will not need to be cooled as much when compared to a system that does not use a common water supply for both heating and cooling.

In addition to sharing heating and cooling losses, using a single piping system for heating and cooling reduces the need for additional piping. In some embodiments, the air handling unit can be coupled to only a single water piping system, such as the potable hot water piping system. In typical existing systems using one piping system for heating and one piping system for cooling, an air handling unit needs to be coupled to two piping systems. Therefore, embodiments can realize cost savings by reducing the amount of installation costs associated with providing two piping systems and connecting an air handling unit to both piping systems, since only a single piping system can be utilized.

As discussed above, various embodiments can use a single water piping system, such as a building's potable hot water supply. In some embodiments, two water piping systems can be used. As an example, some embodiments can involve coupling an air handling unit to two piping systems. In some cases one of the water piping systems can be a building's potable hot water supply and the other water piping system can be a building's potable cold water supply. According to various embodiments, an air handling unit can include a thermal mixing valve that allows the unit to mix water from the two incoming potable water supplies. Mixing water can be useful to, for example, vary the temperature of the water entering the air handling unit.

The disclosed embodiments can also result in lower operating expenses. Energy usage is one of the main costs associated with operating a space cooling and heating system. A standard heat pump uses one or more compressors in both heating and cooling modes. Replacing the heating portion of a heat pump with a different heating element, such as a hot water coil, can eliminate the need to run a compressor in heating mode, thus eliminating the energy consumption of the compressor in the heating mode. In addition, compressors most commonly use electrical energy. In contrast, a water heating device, such as a gas fired boiler, can use natural gas. The energy costs associated with using natural gas can be substantially lower than the costs associated with the electrical energy consumed by running a compressor.

Figure 1:
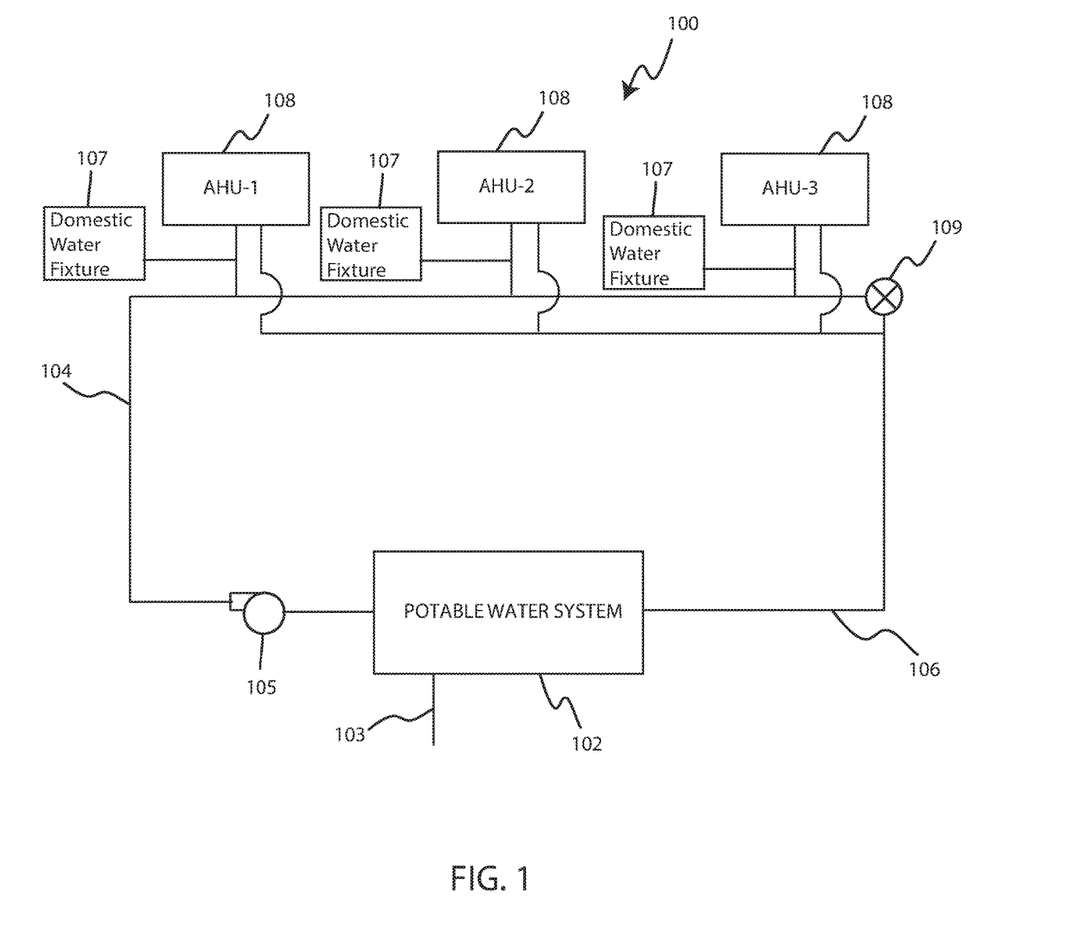
FIG. 1 is a schematic of a portion of a mechanical system for a building, according to an embodiment.

FIG. 1 shows a schematic of a portion of a mechanical system 100 for a building, according to an embodiment. The mechanical system 100 can include a potable water system 102, potable water supply piping 104, potable water return or recirculation piping 106, and one or more air handling units 108.

The potable water system 102 can be coupled to a source 103 of potable water, which in some cases can be a city water supply, water from a private well, or another source of potable water. The potable water system 102 can include a storage tank, such as to hold or retain a portion of the potable water supply. The potable water system 102 can include a water heating device, such as a boiler. In some cases the water heating device can heat the potable water to maintain a temperature of at least 90° F. In other implementations, the water heating device can heat the potable water to maintain a temperature of at least 100° F., at least 110° F., at least 120° F., at least 130° F., or at least 140° F. The potable water system 102 can also include expansion tanks, heat exchangers (such as for connection to dry coolers or cooling towers), heat rejection loop pumps, boiler or water heater circulating pumps, air vents, as well as temperature and pressure sensors.

The potable water piping system can include potable water supply piping 104, such as piping that contains water flowing away from a storage tank or water heating device and towards a destination of intended use. The potable water piping system can include other potable water piping 106, which may be recirculation or return piping, such as piping that recirculates water or piping that contains water flowing away from a location of use (e.g. shower, sink, heat exchanger, hot water coil) and towards a storage tank or water heating device. The potable water piping system can be coupled to one or more domestic water fixtures 107, such as a shower or sink. Although not shown in FIG. 1, in some cases one or more thermal mixing valves are coupled to one or more of the domestic water fixtures 107 and/or to a domestic water pipe or manifold that supplies domestic water to multiple fixtures. Thermal mixing valves can be useful for modifying the temperature of the potable water supply for domestic use while maintaining another temperature for heating and cooling.

In some embodiments, the potable water piping system can include a bypass valve 109, such as to allow unused supply water to enter the return or recirculation piping.

The system 100 or the potable water system 102 can include a recirculating pump 105. The recirculating pump 105 can be configured to pump the potable water supply through the piping system. As one example, the recirculating pump 105 can be used to maintain a fresh or recirculating potable water supply in the potable water supply piping 104 when the potable water supply is not being used by one or more of the domestic water fixtures 107.

According to some implementations, each air handling unit 108 can include a cooling system, a heating system, or both. The cooling system can include a refrigeration circuit. The refrigeration circuit can include an air-refrigerant coil operable to transfer heat from the air stream to the refrigerant within the air-refrigerant coil. The refrigeration circuit can also include a water-refrigerant heat exchanger operable to transfer heat from the refrigerant to the potable water supply. The water-refrigerant heat exchanger can include a potable water supply inlet connection and a potable water outlet connection. The water supply inlet connection can be coupled to the potable water supply piping and the outlet connection can be coupled to the potable water return piping. The refrigeration circuit can include a compressor coupled between the water-refrigerant heat exchanger and the air-refrigerant coil. The refrigeration circuit can further include an expansion valve coupled between the water-refrigerant heat exchanger and the air-refrigerant coil.

In various embodiments, the heating system can include a hot water coil. The hot water coil can be coupled to the potable water supply, such as a hot water coil inlet being coupled to the potable water supply piping and a hot water coil outlet being coupled to the potable water return piping. Various embodiments can include other heating options in addition to or in place of a hot water coil. Examples include, but are not limited to an electric heater and a gas furnace.

Each air handling unit can further include a water valve configured to selectively direct potable water within the potable water supply piping into a cooling system, such as a water-refrigerant heat exchanger, and/or into a heating system, such as a hot water coil. In some embodiments, the water valve can be operable to selectively direct the potable supply water into the water-refrigerant heat exchanger, the hot water coil, or both the water-refrigerant heat exchanger and the hot water coil. In some embodiments, the water valve can be disposed within the air handling unit, such as in a portion of the air handling unit that is outside the air passage. In other embodiments, the water valve can be disposed external to the air handling unit. In heating mode, the water valve can be configured to divert the potable water supply into a hot water coil. In cooling mode, the water valve can be configured to divert the potable water supply into the water-refrigerant heat exchanger. In cooling mode with dehumidification, the water valve can be configured to divert the potable water supply into the hot water coil and the water-refrigerant heat exchanger.

Returning to FIG. 1, the plurality of air handling units 108 can be configured such that potable water is directed to the cooling system of at least one air handling unit and/or potable water is directed to the heating system of a second air handling unit. For example, potable water can flow through a water-refrigerant heat exchanger in at least one of the air handling units 108 at the same time as potable water flows through the hot water coil of another air handling unit. Accordingly, one air handling unit 108 can be cooling air and another air handling unit can be simultaneously heating air. In other embodiments, one of the air handling units can be cooling air, using potable water with a water-refrigerant heat exchanger, and another unit can be heating air without using potable water. As just one example, another unit can be heating air with electric heat.

Figure 2:
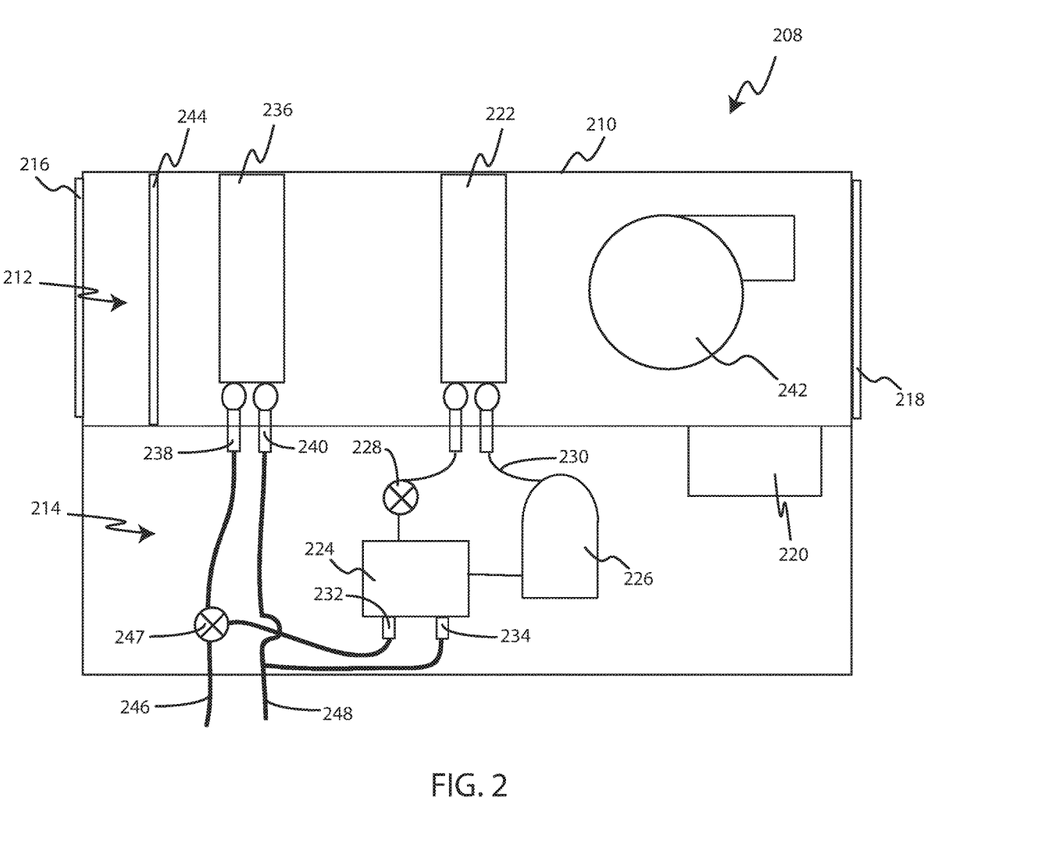
FIG. 2 is a schematic of an air handling unit, according to an embodiment.

FIG. 2 shows a schematic of an air handling unit 208, according to an embodiment. The air handling unit 208 can be operable to cool and/or heat air to a desired temperature. In various embodiments, the air handling unit 208 can include a cooling system and/or a heating system. The cooling system can be configured to cool air to a desired temperature. The heating system can be configured to heat air to a desired temperature. In some embodiments, the cooling system can be configured to cool air to a desired temperature and/or humidity, such as to reduce the humidity of the air, and the heating system can be configured to heat the air to a desired temperature.

The air handling unit 208 can include a housing 210 that can define an air passage 212. The housing 210 can also define a portion 214 that is outside of the air passage. The air passage 212 can extend from an inlet 216 to an outlet 218. Air, such as outdoor air and/or return air, can enter the air passage 212 via the inlet 216. The inlet 216 can be connected to duct work to provide air to the air handling unit 208. Air, such as supply air, can exit the air passage 212 via the outlet 218. The outlet 218 can be connected to duct work to channel air to the desired location. The portion 214 of the housing that is outside of the air passage can house various components of the air handling unit 208, such as a control panel or controller 220.

In various embodiments, the cooling system can include a refrigeration circuit that includes an air-refrigerant coil 222, a water-refrigerant heat exchanger 224, a compressor 226, an expansion valve 228, and piping 230 to connect the various components of the refrigeration circuit. The compressor 226 can be coupled between the water-refrigerant heat exchanger 224 and the air-refrigerant coil 222. The expansion valve 228 can be coupled between the water-refrigerant heat exchanger 224 and the air-refrigerant coil 222. In various embodiments, the water-refrigerant heat exchanger 224 can include a double wall vented heat exchanger. The water-refrigerant heat exchanger 224 can be configured to be coupled to a potable water supply. The water-refrigerant heat exchanger 224 can include a water inlet connection 232 and a water outlet connection 234. The water inlet 232 can be coupled to potable water supply piping and the water outlet 234 can be coupled to potable water return piping. For example, installation of the air handling unit 208 in the mechanical system 100 of FIG. 1 can involve coupling the water inlet 232 to the potable water supply piping 104. Similarly, the water outlet 234 can be coupled to the potable water recirculation or potable water return piping 106.

In various embodiments, the heating system can include a heating element, such as a hot water coil 236. In an embodiment, the hot water coil 236 can include a water inlet connection 238 and a water outlet connection 240. The water inlet connection 238 can be coupled to potable water supply piping (such as potable water supply piping 104 in FIG. 1) and the outlet connection 240 can be coupled to the potable water return piping (such as potable water return piping 106 in FIG. 1).

The heating element, the air-refrigerant coil 222, and a supply fan 242 can be located in the air passage 212. In some embodiments, one or more filters 244 can be located within the air passage 212. Various components can be located within the air handling unit 208, but outside of the air passage 212, such as the compressor 226, water-refrigerant heat exchanger 224, and the control panel or controller 220.

Figure 3:
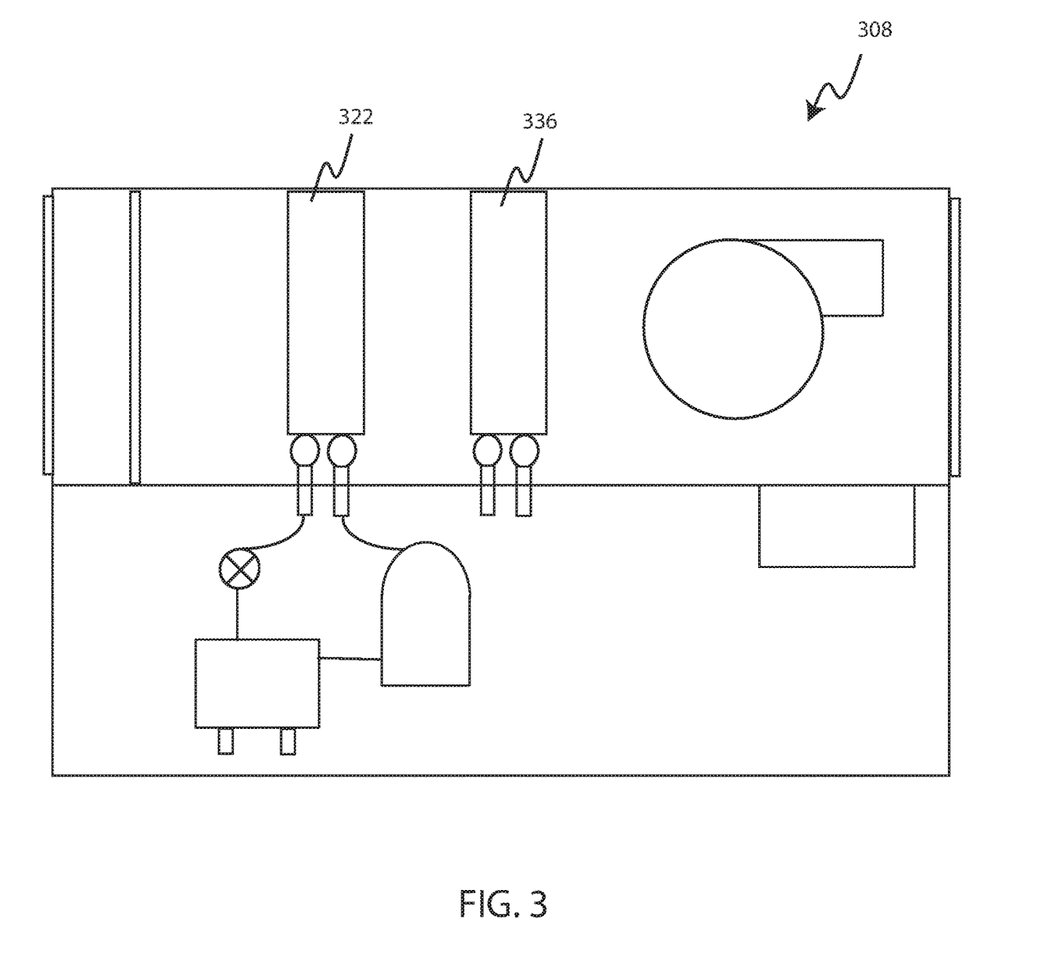
FIG. 3 is a schematic of an air handling unit, according to an embodiment.

In some embodiments, the heating element can be disposed within the air passage 212 upstream from the air-refrigerant coil 222, as shown in FIG. 3. In other embodiments, the heating element can be disposed downstream of the air-refrigerant coil 222.

In various embodiments, the supply fan 242 can be in a draw through configuration, such that the supply fan 242 is disposed downstream of the heating element and the air-refrigerant coil 222. In other embodiments, the supply fan 242 can be located upstream of the heating element and/or the air-refrigerant coil 222, such as in a blow through configuration.

FIG. 2 also shows a water supply inlet 246 and a water return outlet 248 for the air handling unit 208 according to an embodiment. The water supply inlet 246 can be coupled to the potable water supply piping. The water return outlet 248 can be coupled to the potable water return piping. Potable water can be supplied to the air handling unit 208 through the water supply inlet 246. The water valve 247 can direct water to the hot water coil 236 in heating mode, to the water-refrigerant heat exchanger 224 in cooling mode, or both in dehumidification mode. Water directed by the water valve 247 can enter the hot water coil inlet connection 238 or the heat exchanger water inlet 232. The water can exit the air handling unit 208 via the water return outlet 248. Water can exit the hot water coil 236 from the water outlet connection 240 and exit the water-refrigerant heat exchanger 224 from the water outlet 234.

The potable water entering the hot water coil inlet 238 can have a temperature of at least 90° F., at least 100° F., at least 110° F., at least 120° F., at least 130° F., or at least 140° F. Similarly, the potable water entering the water-refrigerant heat exchanger 224 can have a temperature of at least 90° F., at least 100° F., at least 110° F., at least 120° F., at least 130° F., or at least 140° F.

FIG. 3 shows a schematic of an air handling unit 308, according to an embodiment. The air handling unit 308 can include the same elements as the air handling unit 208 described above. In this embodiment, however, the air handling unit 308 can include a heating element, in the form of a hot water coil 336, downstream of the air-refrigerant coil 322, in order to provide reheat, such as in a dehumidification mode.

FIG. 3 shows the heating element, a hot water coil 336, downstream of the air-refrigerant coil 322. The air-refrigerant coil 322 can be configured to cool the air temperature down to a dew point, such that water or moisture is removed from the air.

The heating element can be used to reheat the air to a desired temperature, since the dew point can be lower than the desired temperature.

Figure 4:
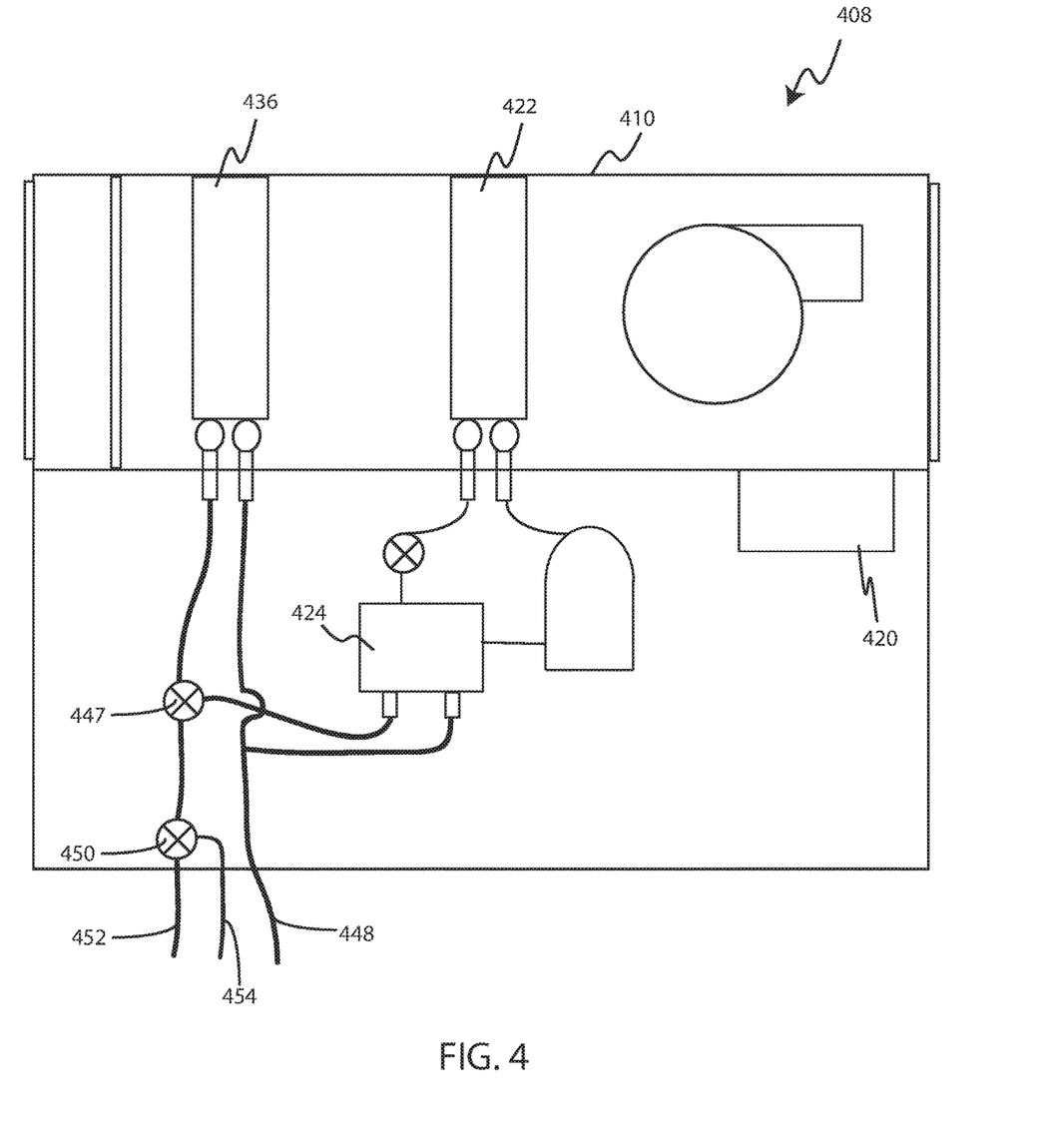
FIG. 4 is a schematic of an air handling unit, according to an embodiment.

Turning now to FIG. 4, a schematic of another air handling unit 408, is shown according to an embodiment. The air handling unit 408 can include many of the same elements as the air handling unit 208 described above with respect to FIG. 2, which are indicated with like reference numbers. In this embodiment, the air handling unit 408 can include a thermal mixing valve 450. The thermal mixing valve 450 can be coupled to the water valve 447 that directs water to one or more of the hot water coil 436 and the water-refrigerant heat exchanger 424. As shown in FIG. 4, the thermal mixing valve 450 is also coupled to a first water supply inlet 452 and a second water supply inlet 454 for the air handling unit 408. The air handling unit 408 also includes a water return outlet 448.

According to various embodiments, the first and second water supply inlets 452, 454 can be coupled to potable water supply piping. The water return outlet 448 can be coupled to the potable water return piping. In some embodiments, the potable water supply piping includes two potable water piping systems. In some cases one of the water piping systems can carry water having a temperature that is higher than the water carried by the other potable water piping system. As one possible example, one of the water piping systems can be a building's potable hot water supply and the other water piping system can be a building's potable cold water supply. In some cases the potable water in one of the piping systems has a temperature of at least 90° F., at least 110° F., or at least 120° F., while the potable water in the other piping system has a temperature lower than 90° F.

According to various embodiments, the potable water from the first and second water supply inlets 452, 454, can be mixed by the thermal mixing valve 450 before flowing to one or more of the hot water coil 436 and the water-refrigerant heat exchanger 424. Mixing the potable water of different temperatures can be useful to, for example, lower or otherwise vary the temperature of the water entering the hot water coil 436 and/or the water-refrigerant heat exchanger 424. According to some embodiments, the unit's controller 420 can be programmed to operate the thermal mixing valve 450 to achieve a desired temperature for the incoming potable water.

Figure 5:
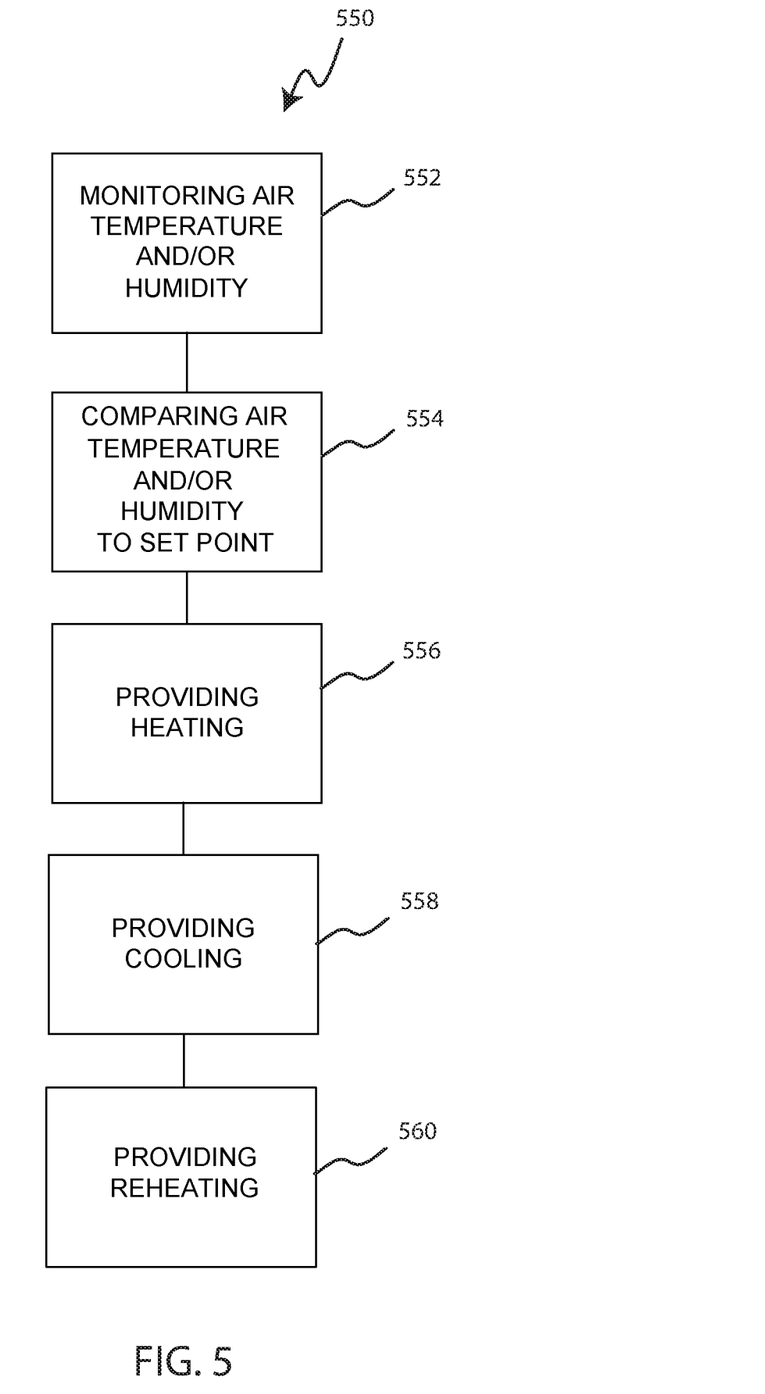
FIG. 5 is a flowchart depicting a method for controlling air temperature, according to an embodiment.

FIG. 5 is a flowchart depicting a method 550 for controlling air temperature, according to an embodiment. The method 550 can include monitoring an air temperature and/or humidity, step 552. The air being monitored can be air in a space (such as a room) that has its temperature and/or humidity being controlled. In other embodiments, the method 550 can include monitoring the air temperature and/or humidity of the air being supplied to the space, but not necessarily the temperature and/or humidity of the air in the space. In other embodiments, the method 550 can include monitoring the temperature and/or humidity of return air, such as exhaust air from the space that can be heated or cooled and then recycled back into the space.

The method 550 can include comparing the temperature and/or humidity of the air, obtained in step 552, to a set point, step 554. The set point can be established by a user based on the desired temperature and/or humidity of the air, such as the desired room temperature and/or humidity, supply air temperature and/or humidity, or return air temperature and/or humidity.

When the temperature of the air is below the temperature set point, the method 550 can include providing heat, step 556. Providing heat can include heating air to a desired temperature with a heating element such as, for example, a hot water coil, an electric heater, or a gas furnace. The air can be heated by passing the air over or across the heating element. In some embodiments where the heating element includes a hot water coil, providing heat can include moving a potable water supply through the hot water coil.

When the temperature of the air is above the temperature set point, the method 550 can include providing cooling, step 558. Providing cooling can include cooling air to a desired temperature with a cooling element, such as an air refrigerant coil and refrigeration circuit. In some embodiments, providing cooling can include moving potable water through a water-refrigerant heat exchanger.

In some embodiments, the method 550 can include monitoring more than one air temperature and/or humidity and comparing monitored air temperatures and/or humidity to set points, such as when there are different spaces that demand different temperature and/or humidity control. As discussed above in reference to FIG. 1, various systems can include a plurality of air handling units. In some scenarios, one or more of the air handling units can be providing heating while one or more other air handling units are providing cooling.

The method 550 can further include providing reheating, step 560. In some embodiments, when the humidity of the air is above the humidity set point, the air handling unit can provide dehumidification. The method 550 can provide cooling in step 558 to lower the temperature of the air, such as to cool the air to a dew point thereby removing moisture from the air. The reheating in step 560 can allow the air to be reheated to a desired temperature, such as a temperature that is above the dew point.

Potable Water

Various embodiments described herein use a supply of potable water. As used herein, a potable water supply is directed to a supply of domestic water. The domestic water supply is safe to be consumed by humans. In some examples, a potable water source can be water that is used for showers, sinks, or other water that has potential to be consumed by humans, such as in a kitchen or bathroom. Potable water is not intended to include water that is not rated for human consumption. Examples of water not rated for human consumption may include water in fire sprinkler systems, non-treated rainwater, greywater, or closed loop hydronic water systems.

Water Heating Device

As discussed above the potable water system can include a water heating device. In some embodiments, the water heating device can include a boiler, such as gas fired boiler. In various embodiments, the water heating device can use natural gas to heat the water. It should be understood that other options for water heating devices are also possible.

Control Sequences

In various embodiments, an air handling unit can include a controller to control the air temperature. For example, the controller can include a microprocessor. In some embodiments, the air handling unit can include a supply air temperature sensor, such as to monitor the temperature of air being supplied by an air handling unit. In some embodiments, the controller can adjust the amount of heating or cooling based on the temperature of the air being supplied by the air handling unit. In some embodiments, the air handling unit can include a room air temperature sensor, such as a temperature sensor in the room being supplied temperature controlled air by the air handling unit. The controller can include additional components, such as high pressure sensors, low pressure sensors, and condensate overflow alarms. The controller can also be configured to include time delays and other safeties associated with protecting the unit.

According to some embodiments, the controller is configured with control sequence logic that implements a purge cycle timer. Such a timer can be used to open water valves in order to periodically purge water within the air handling unit so as to maintain non-stagnant domestic water legs within the air handling unit.

Water-refrigerant Heat Exchangers

In various embodiments, the water-refrigerant heat exchanger can be rated for use with potable water, such that the risk of contaminating the potable water supply is minimized. In some embodiments, the heat exchangers are double wall vented heat exchangers, such as a double wall vented brazed plate heat exchanger. In some embodiments, the heat exchanger can include a plurality of plates. In some embodiments, the heat exchanger can include a coaxial heat exchanger, such as a double wall vented coaxial tube in tube heat exchanger. In some embodiments, the heat exchanger can include a double wall vented shell and tube heat exchanger, such as a double wall vented straight tube heat exchanger or a double wall vented U-tube heat exchanger. In various embodiments, the heat exchanger can be made from stainless steel, copper, or titanium, among other possible materials.

In various embodiments, the water-refrigerant heat exchanger can be domestically rated or rated for use with potable water. In order for a heat exchanger to be domestically rated it can be produced with a vented air gap for separation of the water and the refrigerant in the event that a heat transfer media (pipe or plate) were to fail. During such a failure, the fluid from the failing side of the heat exchanger can leak into the vented air gap and not into the other fluid stream. There are also standards set by the International Association of Plumbing and Mechanical Officials (IAPMO) for metallurgy and manufacturing standards for components used in domestic systems in order to receive a "for potable water use" rating. As an example, oils used for cutting and shaping metal must be safe for human consumption and must have a lower limit for wetted lead content. It will be appreciated that in at least some implementations described herein, the water-refrigerant heat exchanger is used as a condenser. In the condenser configuration, the heat exchanger is being used to reject heat in a refrigeration cycle. Inside the heat exchanger/condenser, the refrigerant is condensing from a gas to a liquid. Thus in some cases the water-refrigerant heat exchanger may be referred to as a condenser.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The technology has been described with reference to various specific and preferred embodiments and techniques. However, it should be understood that many variations and modifications may be made while remaining within the spirit and scope of the technology.

The invention claimed is:

1. A system for controlling air temperature, comprising:
a potable water piping system comprising potable water supply piping, potable water return piping, and a domestic water fixture coupled to the potable water supply piping and the potable water return piping;
a first air handling unit, comprising:
a first cooling system coupled to the potable water piping system, comprising:
a first water-refrigerant heat exchanger;
a first air-refrigerant coil;
a first compressor coupled between the first water-refrigerant heat exchanger and the first air-refrigerant coil; and
a first expansion valve coupled between the first water-refrigerant heat exchanger and the first air-refrigerant coil; and
a first heating system coupled to the potable water piping system, the first heating system comprising a first hot water coil;
a second air handling unit, comprising:
a second cooling system coupled to the potable water piping system, comprising:

a second water-refrigerant heat exchanger;
a second air-refrigerant coil;
a second compressor coupled between the second water-refrigerant heat exchanger and the second air-refrigerant coil; and
a second expansion valve coupled between the second water-refrigerant heat exchanger and the second air-refrigerant coil; and
a second heating system coupled to the potable water piping system, the second heating system comprising a second hot water coil;
wherein the first water-refrigerant heat exchanger and the second water-refrigerant heat exchanger are coupled to the potable water supply piping and the potable water return piping;
wherein the first hot water coil and the second hot water coil are coupled to the potable water supply piping and the potable water return piping; and
wherein the system is configured such that the first air handling unit can provide cooling while the second air handling unit provides heating.

2. The system for controlling air temperature of claim 1, further comprising a potable water supply disposed within the piping system, wherein the potable water supply has a temperature of at least 90° F.

3. The system for controlling air temperature of claim 1, wherein the first water-refrigerant heat exchanger and the second water-refrigerant heat exchanger are each a double wall vented heat exchanger.

4. The system for controlling air temperature of claim 1, further comprising a water valve configured to selectively direct potable water within the potable water supply piping into one or more of the first water-refrigerant heat exchanger, the second water-refrigerant heat exchanger, the first hot water coil and the second hot water coil.

5. The system for controlling air temperature of claim 4, further comprising a thermal mixing valve coupled to the water valve, wherein the potable water supply piping comprises a first potable water piping system coupled to the thermal mixing valve and a second potable water piping system coupled to the thermal mixing valve, wherein the first potable water piping system supplies a first potable water supply having a temperature greater than 90° F., and wherein the second potable water piping system supplies a second potable water supply having a temperature less than 90° F.

6. The system for controlling air temperature of claim 1, wherein the first water-refrigerant heat exchanger and the second water-refrigerant heat exchanger each comprise a plurality of plates.

7. The system for controlling air temperature of claim 1, wherein the first water-refrigerant heat exchanger and the second water-refrigerant heat exchanger each comprise stainless steel or copper.

8. The system for controlling air temperature of claim 1, wherein the domestic water fixture comprises a sink or a shower, wherein the potable water piping system supplies potable water to the first air handling unit, the second air handling unit, and the domestic water fixture.

9. The system for controlling air temperature of claim 1, wherein the potable water piping system comprises a water heating device.

10. The system for controlling air temperature of claim 9, wherein the water heating device comprises a boiler.

11. The system for controlling air temperature of claim 1, wherein the potable water piping system comprises a water storage tank.

12. The system for controlling air temperature of claim 1, wherein the potable water piping system comprises a water heater circulating pump.

13. The system for controlling air temperature of claim 1, wherein the potable water piping system comprises a bypass valve configured for unused supply water to enter the return piping.

14. A method for controlling air temperature, comprising:
monitoring a temperature of air in a first area;
comparing the temperature of the air in the first area to a first temperature set point;
providing heating to the first area when the temperature of the air in the first area is below the first temperature set point;
providing cooling to the first area when the temperature of the air in the first area is above the first temperature set point;
monitoring a temperature of air in a second area;
comparing the temperature of the air in the second area to a second temperature set point;
providing heating to the second area when the temperature of the air in the second area is below the second temperature set point; and
providing cooling to the second area when the temperature of the air in the second area is above the second temperature set point;
wherein providing heating to the first area can occur at the same time as providing cooling to the second area or providing cooling to the first area can occur at the same time as providing heating to the second area;
wherein providing the heating to the first area comprises passing air across a first hot water coil and moving a potable water supply through the first hot water coil, wherein the potable water supply has a temperature of at least 90° F. when entering the first hot water coil;
wherein providing the cooling to the first area comprises passing air across a first air-refrigerant coil and moving refrigerant through the first air-refrigerant coil, wherein the first air-refrigerant coil is coupled to a first compressor, a first expansion valve, and a first water-refrigerant heat exchanger that is coupled to the potable water supply, wherein the potable water supply has a temperature of at least 90° F. when entering the first water-refrigerant heat exchanger;
wherein providing the heating to the second area comprises passing air across a second hot water coil and moving a potable water supply through the second hot water coil, wherein the potable water supply has a temperature of at least 90° F. when entering the second hot water coil;
wherein providing the cooling to the second area comprises passing air across a second air-refrigerant coil and moving refrigerant through the second air-refrigerant coil, wherein the second air-refrigerant coil is coupled to a second compressor, a second expansion valve, and a second water-refrigerant heat exchanger that is coupled to the potable water supply, wherein the potable water supply has a temperature of at least 90° F. when entering the second water-refrigerant heat exchanger.

15. The method for controlling air temperature of claim 14, wherein the first water-refrigerant heat exchanger and the second water-refrigerant heat exchanger are each a double wall vented heat exchanger.

16. The method for controlling air temperature of claim 14, wherein the potable water supply flows through a water valve configured to selectively direct the potable water supply into the first water-refrigerant heat exchanger, the first hot water coil, the second water-refrigerant heat exchanger, and the second hot water coil.

17. The method for controlling air temperature of claim 14, wherein the first water-refrigerant heat exchanger and the second water-refrigerant heat exchanger each comprises a plurality of plates.

18. The method for controlling air temperature of claim 14, wherein the first water-refrigerant heat exchanger and the second water-refrigerant heat exchanger each comprises stainless steel or copper.

19. The method for controlling air temperature of claim 14, wherein the potable water supply comprises a mixture of a first potable water supply having a temperature greater than 90° F. with a second potable water supply having a temperature less than 90° F.

20. A system for controlling air temperature, comprising:
   a potable water piping system comprising potable water supply piping, potable water return piping, and a domestic water fixture;
   a first air handling unit, comprising:
      a first cooling system coupled to the potable water piping system, comprising:
         a first water-refrigerant heat exchanger;
         a first air-refrigerant coil;
         a first compressor coupled between the first water-refrigerant heat exchanger and the first air-refrigerant coil; and
         a first expansion valve coupled between the first water-refrigerant heat exchanger and the first air-refrigerant coil; and
      a first heating system coupled to the potable water piping system, the first heating system comprising a first hot water coil;
   a second air handling unit, comprising:
      a second cooling system coupled to the potable water piping system, comprising:
         a second water-refrigerant heat exchanger;
         a second air-refrigerant coil;
         a second compressor coupled between the second water-refrigerant heat exchanger and the second air-refrigerant coil; and
         a second expansion valve coupled between the second water-refrigerant heat exchanger and the second air-refrigerant coil; and
      a second heating system coupled to the potable water piping system, the second heating system comprising a second hot water coil;
   wherein the first water-refrigerant heat exchanger and the second water-refrigerant heat exchanger are each coupled to the potable water supply piping and the potable water return piping, wherein the potable water supply piping supplies water with a temperature of at least 90° F. to the first water-refrigerant heat exchanger and the second water-refrigerant heat exchanger;
   wherein the first hot water coil and the second hot water coil are each coupled to the potable water supply piping and the potable water return piping;
   wherein the system is configures such that the first air handling unit can provide cooling while the second air handling unit provides heating; and
   wherein the potable water supply piping is configured to provide potable water to the first water-refrigerant heat exchanger, the first hot water coil, the second water-refrigerant heat exchanger, and the domestic water fixture.

* * * * *